(12) United States Patent
Huang et al.

(10) Patent No.: US 11,297,084 B2
(45) Date of Patent: Apr. 5, 2022

(54) METHODS AND APPARATUS TO PERFORM MALWARE DETECTION USING A GENERATIVE ADVERSARIAL NETWORK

(71) Applicant: McAfee, LLC, Santa Clara, CA (US)

(72) Inventors: Yonghong Huang, Hillsboro, OR (US); Raj Vardhan, College Station, TX (US); Celeste Fralick, Lubbock, TX (US)

(73) Assignee: MCAFEE, LLC, San Jose, CA (US)

( * ) Notice: Subject to any disclaimer, the term of this patent is extended or adjusted under 35 U.S.C. 154(b) by 226 days.

(21) Appl. No.: 16/588,540

(22) Filed: Sep. 30, 2019

(65) Prior Publication Data

US 2021/0099474 A1    Apr. 1, 2021

(51) Int. Cl.
*H04L 29/06* (2006.01)
*G06N 3/08* (2006.01)
*G06N 20/00* (2019.01)

(52) U.S. Cl.
CPC ........... *H04L 63/1425* (2013.01); *G06N 3/08* (2013.01); *G06N 20/00* (2019.01)

(58) Field of Classification Search
CPC ...... G06N 20/00; G06N 3/08; H04L 63/1425; H04L 63/14; H04L 63/1408; H04L 63/1416; H04L 63/145; H04L 63/1491; G06F 21/554; G06F 21/566; G06F 21/567; G06F 21/577
See application file for complete search history.

(56) References Cited

U.S. PATENT DOCUMENTS

| | | | | |
|---|---|---|---|---|
| 9,830,315 | B1* | 11/2017 | Xiao | G06N 3/0454 |
| 2003/0055797 | A1* | 3/2003 | Ishihara | G06N 3/08 |
| | | | | 706/15 |
| 2011/0167495 | A1* | 7/2011 | Antonakakis | G06F 9/45508 |
| | | | | 726/24 |
| 2013/0089563 | A1* | 4/2013 | Rotem | C12Q 1/6886 |
| | | | | 424/172.1 |

(Continued)

OTHER PUBLICATIONS

Narayan et al., "Using simulated annealing to optimize receptive fields for MLP networks with ensemble encoding," IJCNN'99. International Joint Conference on Neural Networks. Proceedings (Cat. No. 99CH36339) Year: 1999 | vol. 6 | Conference Paper | Publisher: IEEE.*

(Continued)

*Primary Examiner* — Roderick Tolentino
(74) *Attorney, Agent, or Firm* — Hanley, Flight & Zimmerman, LLC

(57) ABSTRACT

Methods, apparatus, systems and articles of manufacture are disclosed to perform malware detection using a generative adversarial network. An example apparatus includes a first encoder network to encode an input sample into a first encoded sample, the first encoder network implemented using a multilayer perception (MLP) network, a generator network to reconstruct the first encoded sample to generate a reconstructed sample, a discriminator network to, in response to obtaining the first encoded sample and the reconstructed sample, generate a loss function based on the reconstructed sample and the input sample, and an optimization processor to, when the loss function satisfies a threshold loss value, classify the input sample as malicious.

14 Claims, 9 Drawing Sheets

(56) References Cited

U.S. PATENT DOCUMENTS

| | | | | |
|---|---|---|---|---|
| 2016/0359875 | A1* | 12/2016 | Kim | G06F 21/566 |
| 2017/0070517 | A1* | 3/2017 | Bailey | H04L 67/02 |
| 2020/0019863 | A1* | 1/2020 | Dua | G06F 40/216 |
| 2020/0076842 | A1* | 3/2020 | Zhou | G06N 3/0454 |
| 2020/0106805 | A1* | 4/2020 | Gronat | G06N 20/00 |
| 2020/0234468 | A1* | 7/2020 | Lerchner | G06T 9/002 |

OTHER PUBLICATIONS

Nagisetty et al., "Framework for Detection of Malicious Activities in IoT Networks using Keras Deep Learning Library," 2019 3rd International Conference on Computing Methodologies and Communication (ICCMC) Year: 2019 | Conference Paper | Publisher: IEEE.*

Dahl et al., "Large-scale malware classification using random projections and neural networks," [https://www.covert.io/research-papers/deep-learning-security/Large-scale%20Malware%20Classification%20using%20Random%20Projections%20and%20Neural%20Networks.pdf], Acoustics, Speech and Signal Processing (ICASSP), 2013 IEEE International Conference, pp. 3422-3426. IEEE, 5 pages.

Athiwaratkun et al., "Malware classification with LSTM and GRU language models and a character-level CNN," [https://www.microsoft.com/en-usresearchwpcontentuploads/2017/07LstmGruCnnMalwareClassifier.pdf], Acoustics, Speech and Signal Processing (ICASSP), 2017 IEEE International Conference, pp. 2482-2486. IEEE, 5 pages.

Kolter et al., "Learning to detect and classify malicious executables in the wild," [https://nnt.es/Learning%20to%20Detect%20Malicious%20Executables%20in%20the%20Wild.pdf], Proceedings of the tenth ACM SIGKDD international conference on Knowledge discovery and data mining, pp. 2721-2744, ACM 2006, 24 pages.

Pascanu et al. "Malware classification with recurrent networks," [https://www.microsoft.com/en-us/research/wp-content/uploads/2016/02/pascanuIcassp2015.pdf], Acoustics, Speech and Signal Processing (ICASSP), 2015 IEEE International Conference, pp. 1916-1920. IEEE, 2015, 5 pages.

Raman et al., "Selecting features to classify malware," [https://www.covert.io/research-papers/security/Selecting%20Features%20to%20Classify%20Malware.pdf], InfoSec Southwest, 2012, 5 pages.

Saxe et al., "Deep neural network based malware detection using two dimensional binary program features," [https://arxiv.org/pdf/1508.03096.pdf], Malicious and Unwanted Software (Malware), 2015 10th International Conference, pp. 11-20. IEEE, 10 pages.

Schultz et al., "Data mining methods for detection of new malicious executables," [http://ids.cs.columbia.edu/sites/default/files/binaryeval-ieeesp01.pdf], Security and Privacy, 2001. S&P 2001. Proceedings. 2001 IEEE Symposium, pp. 38-49. IEEE, 12 pages.

Raff et al., "Malware detection by eating a whole exe," [https://arxiv.org/pdf/1710.09435.pdf], Oct. 25, 2017, 9 pages.

Goodfellow et al., Generative adversarial nets, [https://arxiv.org/pdf/1406.2661.pdf], Advances in neural information processing systems, Jun. 10, 2014, 9 pages.

Akcay et al., "GANomaly: Semi-Supervised Anomaly Detection via Adversarial Training," [https://arxiv.org/pdf/1805.06725.pdf], Nov. 13, 2018, 16 pages.

Schleg et al., "Unsupervised anomaly detection with GAN to guide marker discovery," [https://arxiv.org/pdf/1703.05921.pdf], IPMI 2017, Mar. 17, 2017, 12 pages.

Zenati et al., "Adversarially Learned Anomaly Detection," [https://arxiv.org/pdf/1812.02288.pdf], In the Proceedings of the 20th IEEE International Conference on Data Mining (ICDM), Dec. 6, 2018, 11 pages.

Wang et al., "Adversary resistant deep neural networks with an application to malware detection," [https://arxiv.org/pdf/1610.01239.pdf], In Proceedings of the 23rd International Conference on Knowledge Discovery and Data Mining (KDD), Apr. 27, 2017, 9 pages.

Saxe et al., "Deep neural network based malware detection using two dimensional binary program features," [https://arxiv.org/pdf/1610.01239.pdf], In Proceedings of the 10th International Conference on Malicious and Unwanted Software (Malware), Sep. 3, 2015, 10 pages.

Arp et al., "DREBIN:Effective and Explainable Detection of Android Malware in Your Pocket," [https://www.sec.cs.tu-bs.de/pubs/2014-ndss.pdf], In Proceedings of the 20th Network and Distributed System Security Symposium (NDSS), 15 pages.

Grosse et al., "Adversarial perturbations against deep neural networks for malware classification," [https://arxiv.org/pdf/1606.04435.pdf], Jun. 16, 2016, 12 pages.

Berlin et al., "Malicious behavior detection using windows audit logs," [https://arxiv.org/pdf/1506.04200.pdf], In Proceedings of the 8thWorkshop on Artificial Intelligence and Security (AISec), Aug. 25, 2015, 10 pages.

Radford et al., "Unsupervised Representation Learning with Deep Convolutional Generative Adversarial Networks," [https://arxiv.org/pdf/1511.06434.pdf], In ICLR (2016), Jan. 7, 2016, 16 pages.

Anderson et al., "Emberian open dataset for training static PE malware ML models," [https://arxiv.org/pdf/1804.04637.pdf], Apr. 16, 2018, 8 pages.

* cited by examiner

METHODS AND APPARATUS TO PERFORM MALWARE DETECTION USING A GENERATIVE ADVERSARIAL NETWORK

FIELD OF THE DISCLOSURE

This disclosure relates generally to malware detection, and, more particularly, to methods and apparatus to perform malware detection using a generative adversarial network.

BACKGROUND

Malware (e.g., viruses, worms, trojans, ransomware) is malicious software that is disseminated by attackers to launch a wide range of security attacks, such as stealing user's private information, hijacking devices remotely to deliver massive spam emails, infiltrating a user's online account credentials, etc. The introduction of malware to a computing system may cause serious damages and significant financial loss to computer and/or Internet users.

Figure 1:
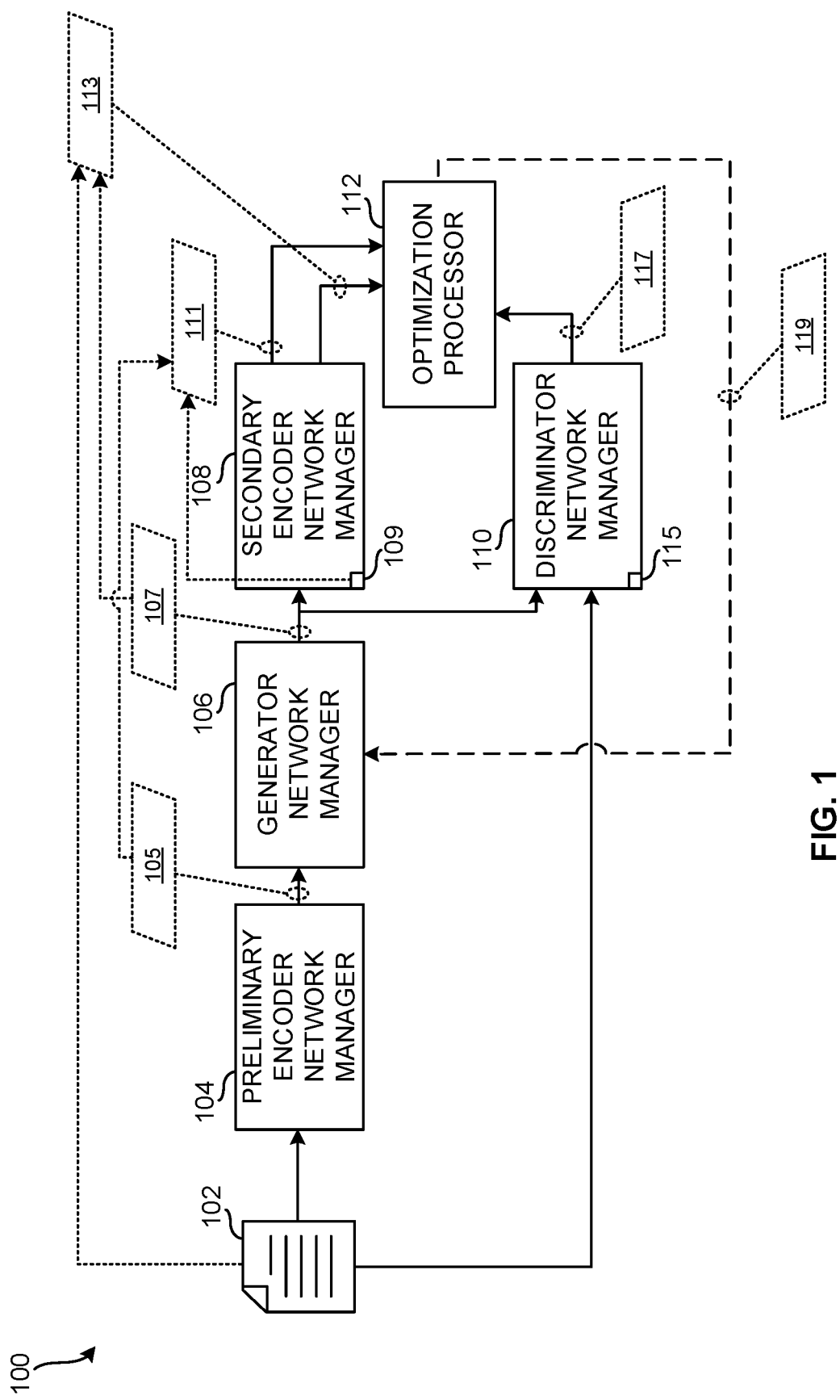
FIG. 1 is diagram of an example malware detection system to classify an example input sample using a plurality of neural network models.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Malicious software may enable an attacker to obtain a user's private information, hijack devices remotely to deliver massive spam emails, infiltrate a user's online account credentials, etc. The introduction of malware to a computing system may cause serious damages and significant financial loss to computer and/or Internet users.

Some applications to detect malware involve utilizing a machine learning (ML) and/or otherwise artificial intelligent approach (AI). Such applications are performed using a supervised ML and/or other AI model such as, for example, a convolutional neural network (CNN), a recurrent neural network (RNN), etc. In such approaches, the supervised ML and/or other AI model is configured to be trained using labeled input data. To label input data as malicious or safe, often highly-trained individuals spend significant periods of time (e.g., hours, days, weeks, etc.), attempting to parse through code and/or software to identify malicious and/or potentially anomalous activity. Such an approach is reliant on the accuracy of the highly-trained security expert to correctly spot malicious and/or potentially anomalous activity. Further, any inaccuracies originating during the labeling process (e.g., labeling a code segment as malware when the code segment is actually safe, etc.) propagate throughout the model and, thus, cause inaccurate and/or otherwise unreliable results.

Other approaches to detect malware and/or potentially anomalous activity include utilizing an unsupervised ML and/or otherwise AI model such as, for example, autoencoders, clustering techniques, etc., configured to be trained using unlabeled input data. Such approaches are inefficient at detecting zero-day malware (e.g., malware that is unknown to the system) and at handling malware concept drift (e.g., changes in malware over time). As used herein, zero-day malware refers to a malware vulnerability that is unknown to, or unaddressed, by malware detection and/or mitigation systems. As used herein, concept drift occurring with malware, or malware concept drift, refers to any change in malware properties over time.

As mentioned above, approaches utilizing a supervised or an unsupervised ML and/or AI model cannot efficiently detect malware. For example, an approach utilizing a supervised or an unsupervised ML and/or AI model to detect malware may be trained to detect malware that performs a specific function. If such a specific function is altered over time, the trained supervised or unsupervised ML and/or AI models may not reliably detect such a concept drift.

Examples disclosed herein include methods and apparatus to perform malware detection using a generative adversarial network (GAN) and an autoencoder network model.

Examples disclosed herein include utilizing a GAN in an unsupervised manner to perform malware detection. Examples disclosed herein include a ML and/or AI model utilizing autoencoders and GANs. More specifically, examples disclosed herein utilize a ML and/or AI model including a plurality of neural networks such as a first and second encoder network, a generator network, and a discriminator network. In some examples disclosed herein, the first and second encoder networks may be operable as a single encoder network.

Examples disclosed herein utilize a first encoder network configured to obtain an input sample. Such an example first encoder network is configured to downscale (e.g., compress) the input sample into a first sample (e.g., a downscaled or compress sample). In examples disclosed herein, the first encoder network is implemented using a multilayer perceptron (MLP) network. Examples disclosed herein utilize a generator network (e.g., a generator network included in a GAN) to obtain the first sample from the first encoder network. In examples disclosed herein, the generator network is configured to upscale the first sample (e.g., decode and/or otherwise decompress the first sample) to create a second sample. In examples disclosed herein, the upscaled (e.g., decoded, decompressed, etc.) sample from the generator is transmitted to an example second encoder network and to an example discriminator network (e.g., a discriminator network in a GAN).

Examples disclosed herein utilize a ML and/or other AI model to generate a malware deepfake. Deepfakes may be generated using a GAN to make fake videos of people (e.g., celebrities or politicians) say or do things that that they did not actually say. Examples disclosed herein utilize a GAN to generate deepfakes of malware to predict zero-day malware, concept drift malware, etc. Accordingly, examples disclosed herein can be used to detect whether an input sample is malicious regardless of whether the input sample includes zero-day malware, concept drift malware, etc.

Examples disclosed herein train the autoencoder and GAN model using safe and/or otherwise benign samples. In this manner, the autoencoder and GAN model is an unsupervised model. During an example inference phase, an unknown sample (e.g., a benign or malicious sample) may be input into the autoencoder and GAN model to compress and reconstruct the unknown sample. In some examples, the inference phase may additionally or alternatively be referred to as an operational phase. In examples disclosed herein, such a reconstructed sample is associated with a loss function the corresponds to one or more loss functions determined by the example second encoder network and/or the discriminator network.

Examples disclosed herein include a threshold error level to compare against the reconstructed samples (e.g., the loss function). In some examples disclosed herein, the threshold error level may be set to ensure a desired false detection rate (e.g., a 0.1% false positive rate). For example, a higher threshold error level may correspond to a lower tolerance in detection certainty.

For example, examples disclosed herein utilize three AI networks. In such examples disclosed herein, an example first network includes of an example first encoder network and an example generator network. In operation, the first encoder network encodes an input sample (e.g., a sample of an input PE file) into a first encoded sample (e.g., a latent feature set). In examples disclosed herein, the first encoder network is implemented using a multi-layer perception (MLP) network. The example generator network operates as a decoder to reconstruct the first encoded sample to generate a reconstructed sample.

In examples disclosed herein, the example second network is an example second encoder network. The second encoder network is to encode the reconstructed sample into the second encoded sample (e.g., a second latent feature set). The second encoder is implemented using a MLP network.

In examples disclosed herein, the example third network is an example discriminator network. In operation, the example discriminator network classifies the input sample and the reconstructed sample as "real" or "fake," respectively.

Examples disclosed herein include training the first, second and/or third networks. As such, examples disclosed herein include utilizing save (e.g., benign) input samples to train the first, second, and/or third networks. Examples disclosed herein include optimizing an example overall (e.g., total) loss as weighted sum of three example losses. The three example losses may include an example adversarial loss, an example contextual loss, and an example encoder loss. The adversarial loss corresponds to a first distance (e.g., a L2-norm distance) between the feature representation of the original input sample (e.g., the first encoded sample) and the reconstructed sample. Such an example loss may be minimized to generate realistic samples. The contextual loss corresponds to a second distance (e.g., a L1-norm distance) between the original input sample and the reconstructed sample. Such an example loss ensures generated samples are contextually sound, rational, and/or accurate. The encoder loss corresponds to a third distance between the latent feature set of original samples (e.g., the first encoded sample) and the latent feature set of the reconstructed samples.

In examples disclosed herein, during operation, the example encoder loss may identify a score corresponding to the abnormity of a given input sample. If the score of the input sample is larger than a certain threshold, examples disclosed herein include classifying the input sample a malicious and/or an anomaly. Such an event may occur when there exists a dissimilarity within latent feature space for an input sample. Such a dissimilarity may exist for malicious input samples because the first, second, and third networks are trained using safe (e.g., benign) input samples.

FIG. 1 is a diagram of an example malware detection system to classify an example input sample 102 using a plurality of neural network models. The malware detection system 100 includes an example preliminary encoder network manager 104, an example generator network manager 106, an example secondary encoder network manager 108, an example discriminator network manager 110, and an example optimization processor 112. In the example illustrated in FIG. 1, the malware detection system 100 may be referred to as a GAN-encoder or a GAN-autoencoder neural network model. In some examples disclosed herein, the malware detection system 100 may not include the optimization processor 112 and/or the input sample 102. The malware detection system 100 may be operable in an example training phase, in which the malware detection system 100 is implemented at a server, datacenter, etc., to generate an example trained model. Further, the malware detection system 100 may be operable in an example inference phase, in which the malware detection system 100 is implemented at a server, datacenter, etc., located separately from the training server, datacenter, etc. Such an example malware detection system 100 operating in an example inference phase may be configured to obtain the trained model for use in execution with an unknown input sample.

In examples disclosed herein, the input sample 102 is a portable executable (PE) file. The input sample 102 is configured to be sent to the preliminary encoder network manager 104 or, alternatively, the preliminary encoder network manager 104 may retrieve the input sample 102 from a database. During an example training phase, the input sample 102 is safe and/or otherwise benign. During an example inference phase, the input sample 102 may be an unknown sample obtained in the form of a portable executable (PE) file. Alternatively, the input sample 102 may be any suitable input sample and/or block of code (e.g., an executable file, a binary file, etc.) to be classified, analyzed, etc., by the malware detection system 100 as malicious or safe.

In the example illustrated in FIG. 1, the preliminary encoder network manager 104 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In FIG. 1, the first encoding operation performed by the preliminary encoder network manager 104 is an encoding process executed using a MLP network. As such, the preliminary encoder network manager 104 performing the first encoding operation using a MLP network enables efficient encoding when the input sample 102 is in the form of a code block (e.g., a PE file). Alternatively, in other examples disclosed herein, the preliminary encoder network manager 104 may be implemented using an encoder included in an autoencoder neural network model. The preliminary encoder network manager 104 is configured to determine whether the input sample 102 is received and/or otherwise available. In the event the preliminary encoder network manager 104 determines the input sample 102 is received and/or otherwise available, the preliminary encoder network manager 104 performs a first encoding operation on the input sample 102 to generate an example first encoded sample 105. Such a resulting first encoded sample 105 is a signal embedded representation of the input sample 102. Alternatively, such an example first encoding operation performed by the preliminary encoder network manager 104 may be any suitable encoding, compressing, and/or down sampling method using any suitable device and/or network of devices (e.g., a convolutional neural network (CNN), a probabilistic neural network (PNN), a time delay neural network (TDNN), etc.). In some examples, the example preliminary encoder network manager 104 implements means for encoding.

In the example illustrated in FIG. 1, the generator network manager 106 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In FIG. 1, the generator network manager 106 may be implemented using GAN, a deep convolutional GAN (DCGAN), etc. Alternatively, the generator network manager 106 may be implemented using a decoder included in an autoencoder neural network. The generator network manager 106 is configured to decode and/or otherwise upscale the example first encoded sample 105. In this manner, the generator network manager 106 reconstructs the first encoded sample 105 to generate an example reconstructed sample 107. The generator network manager 106 further transmits the reconstructed sample 107 to the secondary encoder network manager 108. During an example operational and/or otherwise inference phase, if the input sample 102 is a malicious sample (e.g., malware), the generator network manager 106 may not accurately reconstruct the input sample 102. Further in such an example, the reconstructed sample 107 may differ greatly from the input sample 102 because the malware detection system 100 is trained using safe and/or otherwise benign input samples. In some examples, the example generator network manager 106 implements means for reconstructing.

In examples disclosed herein, the secondary encoder network manager 108 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In examples disclosed herein, the second encoding operation performed by the secondary encoder network manager 108 is an encoding process executed using a MLP network. As such, the secondary encoder network manager 108 performing the second encoding operation using a MLP network enables efficient encoding when the input sample 102 is in the form of a code block (e.g., a PE file). In other examples disclosed herein, the secondary encoder network manager 108 may be implemented using an encoder included in an autoencoder neural network model. Alternatively, in some examples disclosed herein, the secondary encoder network manager 108 may be implemented using the same encoder network as the preliminary encoder network manager 104.

The secondary encoder network manager 108 is configured to determine whether the reconstructed sample 107 is received and/or otherwise available. In the event the secondary encoder network manager 108 determines the reconstructed sample 107 is received and/or otherwise available, the secondary encoder network manager 108 performs a second encoding operation on the reconstructed sample 107 to generate an example second encoded sample 109. Such a resulting second encoded sample 109 is a signal embedded representation of the reconstructed sample 107. In this manner, any noise existing in the reconstructed sample 107 may be amplified in the second encoded sample 109. Alternatively, such an example second encoding operation performed by the secondary encoder network manager 108 may be any suitable encoding, compressing, and/or down sampling method using any suitable device and/or network of devices (e.g., a convolutional neural network (CNN), a probabilistic neural network (PNN), a time delay neural network (TDNN), etc.). In some examples, the example secondary encoder network manager 108 implements second means for encoding.

In addition, the secondary encoder network manager 108 is configured to identify an example first loss function 111 and an example second loss function 113. In examples disclosed herein, the first loss function 111 is an example encoder loss and corresponds to a difference (e.g., a distance) between the second encoded sample 109 and the first encoded sample 105. The first loss function 111 may be identified using the below equation, Equation 1.

$$L_1 = \|z - \hat{z}\|_2 \qquad \text{Equation 1}$$

In Equation 1, the variable $L_1$ corresponds to the first loss function 111 (e.g., the encoder loss function), the variable z corresponds to the first encoded sample 105, and the variable $\hat{z}$ corresponds to the second encoded sample 109. The first loss function 111 (e.g., the encoder loss function) corresponds to a distance between the latent feature set of original samples (e.g., the first encoded sample 105) and the latent feature set of the reconstructed sample (e.g., second encoded sample 109).

In examples disclosed herein, the second loss function 113 is an example contextual loss function and corresponds to a difference (e.g., a distance) between the reconstructed sample 107 and the input sample 102. The second loss function 113 may be identified using the below equation, Equation 2.

$$L_2 = \|x - \hat{x}\|_1 \qquad \text{Equation 2}$$

In Equation 2, the variable $L_2$ corresponds to the second loss function 113 (e.g., the contextual loss function), the variable x corresponds to the input sample 102, and the variable $\hat{x}$ corresponds to the reconstructed sample 107. The second loss function 113 (e.g., the contextual loss function) corresponds to a distance (e.g., a L1-norm distance) between the original input sample (e.g., the input sample 102) and the reconstructed sample (e.g., the reconstructed sample 107.

In the example illustrated in FIG. 1, the discriminator network manager 110 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The discriminator network manager 110 may be implemented as using a GAN, a DCGAN, etc. The discriminator network manager 110 is configured to determine whether the input sample 102 and/or the reconstructed sample 107 is received and/or otherwise available. In the event the discriminator network manager 110 determines the input sample 102 and/or the reconstructed sample 107 is received and/or otherwise available, the discriminator network manager 110 performs a third encoding operation to generate an example third encoded sample 115. In examples disclosed herein, the third encoding operation performed by the discriminator network manager 110 is an encoding process executed using a DCGAN. Alternatively, such an example third encoding operation performed by the discriminator network manager 110 may be any suitable encoding, compressing, and/or down sampling method using any suitable device and/or network of devices (e.g., a convolutional neural network (CNN), a probabilistic neural network (PNN), a time delay neural network (TDNN), a MLP network, etc.). The discriminator network manager 110 further classifies the third encoded sample 115 as safe (e.g., benign) or malicious. In examples disclosed herein, the discriminator network manager 110 identifies and transmits an example third loss function 117 to the optimization processor 112. In some examples, the example discriminator network manager 110 implements means for determining.

In examples disclosed herein, the third loss function 117 is an example adversarial loss function and corresponds to a difference (e.g., a distance) between the input sample 102 and the reconstructed sample 107. The third loss function 117 may be identified using the below equation, Equation 3.

$$L_3 = \|f(x) - f(\hat{x})\|_2 \qquad \text{Equation 3}$$

In Equation 3, the variable $L_3$ corresponds to the third loss function 117 (e.g., the adversarial loss function), the variable x corresponds to the input sample 102, and the variable $\hat{x}$ corresponds to the reconstructed sample 107.

In FIG. 1, the example optimization processor 112 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In FIG. 1, the optimization processor 112 is configured to obtain the first loss function 111, the second loss function 113, and the third loss function 117. The optimization processor 112 is configured to identify an example overall loss as a weighted sum of the first loss function 111, the second loss function 113, and the third loss function 117. For example, the optimization processor 112 parses the obtained loss functions (e.g., the first, second, and third loss functions 111, 113, 117) to identify an overall loss function. In examples disclosed herein, the optimization processor 112 may identify the overall loss function as a weighted sum of the first, second, and third loss functions 111, 113, 117.

Alternatively, in some examples disclosed herein, the optimization processor 112 may parse the first loss function 111 (e.g., the example encoder loss) to identify the overall loss function (e.g., a score corresponding to the abnormality of a given input sample). In such an example, if the overall loss function is larger than a loss threshold, examples disclosed herein include the optimization processor 112 to classify the input sample 102 a malicious and/or an anomaly. Such an event may occur when there exists a dissimilarity within latent feature space for an input sample.

In some examples, the example optimization processor 112 implements means for classifying.

In response to determining the overall loss function, the optimization processor 112 is configured to determine whether the overall loss satisfies a threshold loss value. For example, if the optimization processor 112 determines the overall loss satisfies (e.g., exceeds) the threshold loss, the optimization processor 112 may classify such a corresponding input sample 102 as malicious. Alternatively, if the optimization processor 112 determines the overall loss value does not satisfy (e.g., does not exceed) the threshold loss, the optimization processor 112 may classify such a corresponding input sample 102 as safe (e.g., benign).

When training the example malware detection system 100 of FIG. 1, the optimization processor 112 updates corresponding weights of any of the first loss function 111, the second loss function 113, and/or the third loss function 117 in an example weight adjustment signal 119. Such a weight adjustment signal 119 may be utilized by the generator network manager 106 to alter operating parameters during training. The weight adjustment signal 119 may be generated using the below equation, Equation 4.

$$L_X = w_1 L_1 + w_2 L_2 + w_3 L_3 \qquad \text{Equation 4}$$

In Equation 4, the variable $L_x$ corresponds to the overall loss included in the weight adjustment signal 119, the variable w1 corresponds to the weight applied to the first loss function, $L_1$. The variable $w_2$ corresponds to the weight applied to the second loss function, $L_2$. The variable $w_3$ corresponds to the weight applied to the third loss function, $L_3$. In examples disclosed herein, during training, the optimization processor 112 may adjust any of $w_1$, $w_2$, and/or $w_3$ in order to minimize the overall loss.

During an example training operation, the preliminary encoder network manager 104 is configured to obtain the input sample 102. For example, during training the input sample 102 may be obtained from an opensource dataset (e.g., Ember dataset, etc.) and, as such, represented as a one-dimensional vector. In such a manner, the input sample 102 may be identified as a N×D matrix, in which N corresponds to the number of samples and D corresponds to the sample dimension. Therefore, during training operation the input sample 102 is a N×D matrix such that the minimum of every feature value across all samples is 0 and the maximum is 1.

In examples disclosed herein, the input sample 102 may be normalized and/or otherwise transformed using an example transformation pre-processing method. For example, the input sample 102 may be transformed into an a N×D matrix such that the minimum of every feature value across all samples is 0 and the maximum is 1. In other examples disclosed herein, the input sample 102 may be transformed, scaled, pre-processed, etc., using an alternative linear and/or nonlinear transformation, pre-processing, and/or scaling method such as zero mean, unit variance scaling, etc.

Moreover, in an example training operation, the input sample 102 is a safe and/or otherwise a benign input sample. In this manner, during an inference phase, the input sample 102 is unknown and, when the input sample 102 is malicious, the resulting reconstructed sample 107 may have additional noise not known by the malware detection system 100. For example, when the input sample 102 is malicious, noise may be injected into the reconstructed sample 107 when reconstructing the first encoded sample 105. In this manner, because the malware detection system 100 is familiar and trained with safe (e.g., benign) input samples, such a malware detection system 100 may be inefficient at reconstructing malicious samples.

While FIG. 1 illustrates an example training operation (e.g., the transmission of the weight adjustment signal 119 to the generator network manager 106) and an example inference phase, any of the training operation and/or inference phase may be implemented on a single system or separate systems. For example, the training operation of the malware detection system 100 may occur at a server configured to generate a trained model of the system. Such an example training operation may occur at a server, datacenter, etc., located externally to the computing device utilizing the trained model. Further, the computing device utilizing the trained model may communicate with the server, datacenter, etc. performing the training to obtain the trained model. The computing device may then input an unknown sample (e.g., the input sample 102) into the trained model to identify whether the unknown sample (e.g., the input sample 102) is safe or malicious.

Figure 2:
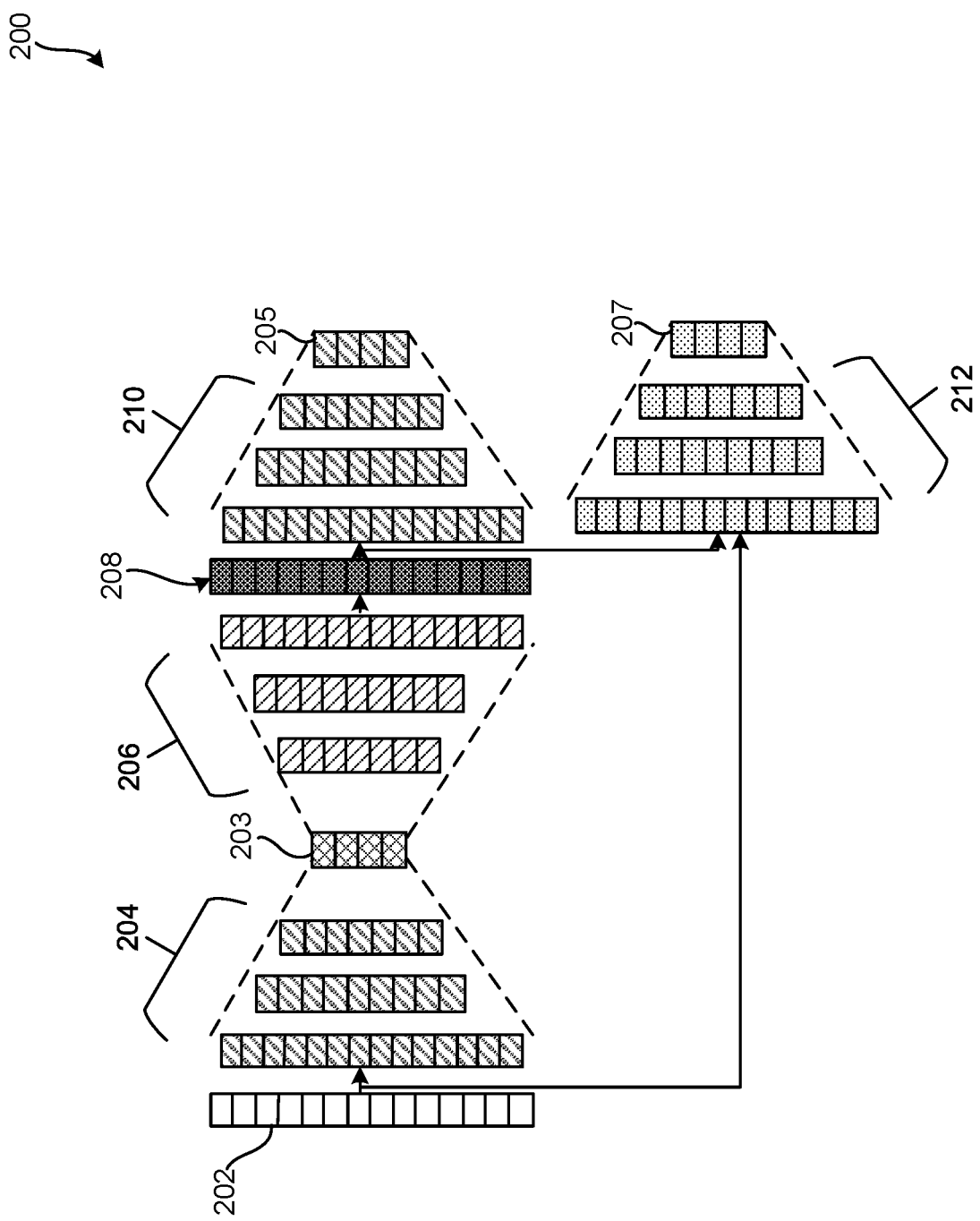
FIG. 2 is an example graphical illustration depicting a neural network vector diagram illustrating a neural network framework of the malware detection system of FIG. 1.

FIG. 2 is an example graphical illustration 200 depicting a neural network vector diagram illustrating a neural network framework of the malware detection system 100 of FIG. 1. The illustration 200 includes an example input classification vector 202, an example first encoder vector set 204, an example reconstruction vector set 206, an example reconstructed vector 208, an example second encoder vector set 210, and an example discriminator vector set 212. In FIG. 2, the input classification vector 202 and the reconstructed vector 208 may implemented in a single layer in a neural network architecture. Moreover, the input classification vector 202 may correspond to an example input vector (e.g., the input sample 102 of FIG. 1) to the example preliminary encoder network manager 104 of FIG. 1. The first encoder vector set 204 may correspond to a vector transformation performed by the example preliminary encoder network manager 104 of FIG. 1. The reconstruction vector set 206 corresponds to a vector transformation performed by the generator network manager 106 of FIG. 1. The reconstructed vector 208 corresponds to an example input vector (e.g., the reconstructed sample 107 of FIG. 1) to the example secondary encoder network manager 108 of FIG. 1. The second encoder vector set 210 corresponds to a vector transformation performed by the example secondary encoder network manager 108 of FIG. 1. The discriminator vector set 212 corresponds to a vector transformation performed by the example discriminator network manager 110 of FIG. 1.

In the example illustrated in FIG. 2, the first encoder vector set 204, the reconstruction vector set 206, the second encoder vector set 210, and/or the discriminator vector set 212 may be illustrated using any suitable number of sublayers and/or vector transformations. For example, the first encoder vector set 204 is illustrated as a neural network model including three sub layers, configured to encode a respective input.

In the example illustrated in FIG. 2, the first encoder vector set 204 illustrates example compression steps taken by the preliminary encoder network manager 104 of FIG. 1. As such, the first encoder vector set 204 illustrates the compression, encoding, downscaling, and/or otherwise down sampling process to generate an example first encoded vector 203 (e.g., the first encoded sample 105 of FIG. 1).

In the example illustrated in FIG. 2, the reconstruction vector set 206 illustrates example decompression steps taken by the generator network manager 106 of FIG. 1. As such, the reconstruction vector set 206 illustrates the decompression, decoding, upscaling, and/or otherwise up-sampling process to generate the example reconstruction vector 208.

In the example illustrated in FIG. 2, the second encoder vector set 210 illustrates example compression steps taken by the secondary encoder network manager 108 of FIG. 1. As such, the second encoder vector set 210 illustrates the compression, encoding, downscaling, and/or otherwise down sampling process to generate an example second encoded vector 205 (e.g., the second encoded sample 109 of FIG. 1).

In the illustrated example of FIG. 2, the discriminator vector set 212 illustrates example compression steps taken by the discriminator network manager 110 of FIG. 1. As such, the discriminator vector set 212 illustrates the compression, encoding, downscaling, and/or otherwise down sampling process to generate an example third encoded vector 207 (e.g., the third encoded sample 115 of FIG. 1).

While an example manner of implementing the malware detection system 100 of FIG. 1 is illustrated in FIGS. 1 and/or 2, one or more of the elements, processes and/or devices illustrated in FIG. 1 may be combined, divided, re-arranged, omitted, eliminated and/or implemented in any other way. Further, the example input sample 102, the example preliminary encoder network manager 104, the example generator network manager 106, the example secondary encoder network manager 108, the example discriminator network manager 110, the example optimization processor 112, and/or, more generally, the example malware detection system 100 of FIG. 1 may be implemented by hardware, software, firmware and/or any combination of hardware, software and/or firmware. Thus, for example, any of the example input sample 102, the example preliminary encoder network manager 104, the example generator network manager 106, the example secondary encoder network manager 108, the example discriminator network manager 110, the example optimization processor 112, and/or, more generally, the example malware detection system 100 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example input sample 102, the example preliminary encoder network manager 104, the example generator network manager 106, the example secondary encoder network manager 108, the example discriminator network manager 110, the example optimization processor 112 is/are hereby expressly defined to include a non-transitory computer readable storage device or storage disk such as a memory, a digital versatile disk (DVD), a compact disk (CD), a Blu-ray disk, etc. including the software and/or firmware. Further still, the example malware detection system 100 of FIG. 1 may include one or more elements, processes and/or devices in addition to, or instead of, those illustrated in FIGS. 1 and/or 2, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the malware detection system 100 of FIGS. 1 and/or 2 are shown in FIGS. 3, 4, 5, 6, and/or 7. The machine readable instructions may be one or more executable programs or portion(s) of an executable program for execution by a computer processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 3, 4, 5, 6, and/or 7 many other methods of implementing the example malware detection system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3, 4, 5, 6, and/or 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 3:
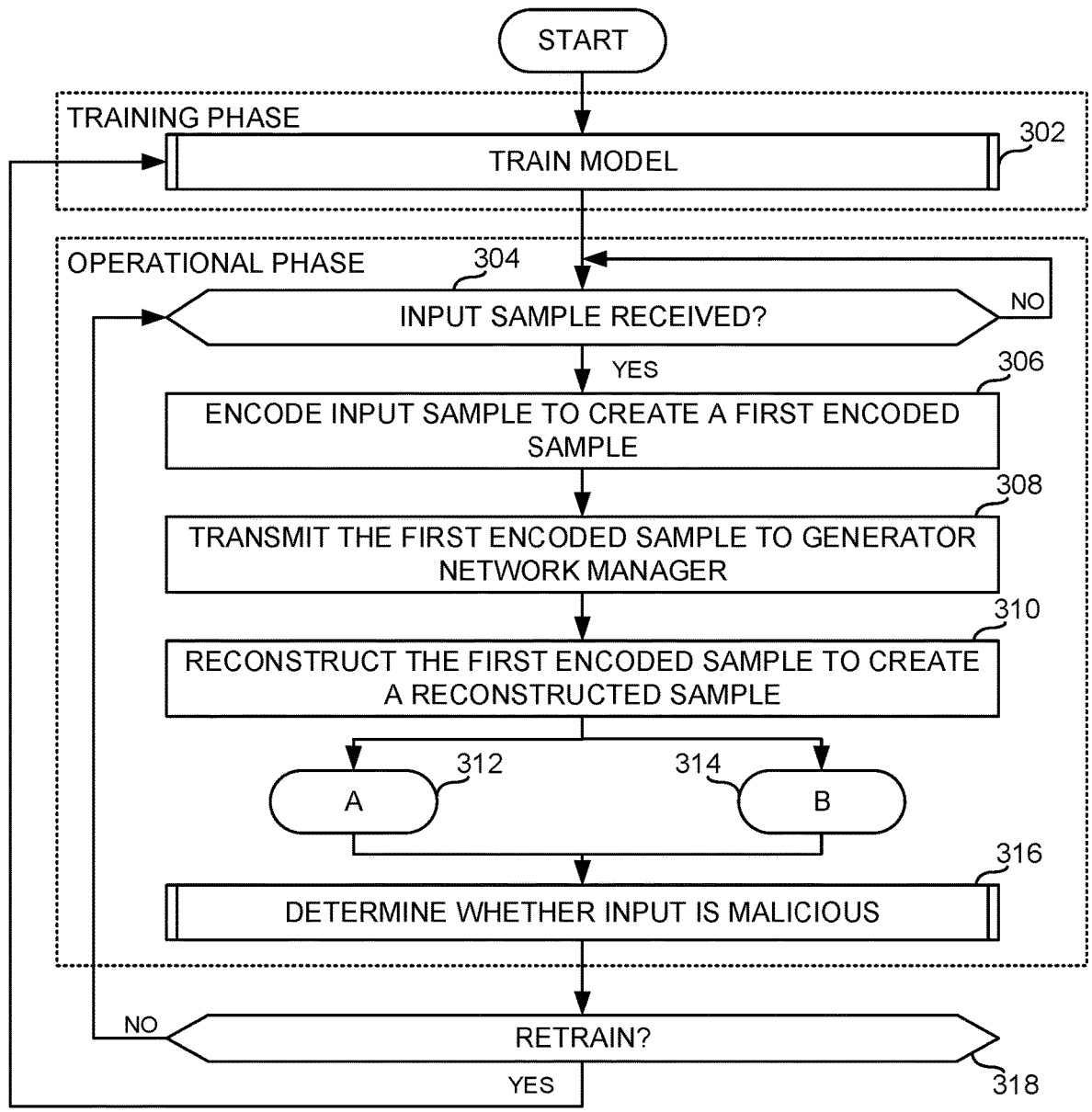
FIG. 3 is a flowchart representative of a process that may be executed to implement the malware detection system of FIG. 1 to train the system and/or determine whether the example input sample is malicious.

FIG. 3 is a flowchart representative of a process that may be executed to implement the malware detection system 100 of FIG. 1 to train the system and/or determine whether the example input sample 102 is malicious. In the example of FIG. 3, the malware detection system 100 of FIG. 1 is configured to train the model during an example training phase. (Block 302). Detailed instructions to execute model training are illustrated and described in connection with FIG. 4.

During example operational phase, the preliminary encoder network manager 104 of FIG. 1 is configured to determine whether the input sample 102 is received and/or otherwise available. (Block 304). In the event the preliminary encoder network manager 104 determines the input sample 102 is not received and/or otherwise available (e.g., the control of block 304 returns a result of NO) control proceeds to wait. Alternatively, in the event the preliminary encoder network manager 104 determines the input sample 102 is received and/or otherwise available (e.g., the control of block 304 returns a result of YES), the preliminary encoder network manager 104 performs a first encoding operation to encode the input sample 102 to generate the first encoded sample 105. (Block 306). In response, the preliminary encoder network manager 104 transmits the first encoded sample 105 to the generator network manager 106. (Block 308).

In the example illustrated in FIG. 2, the generator network manager 106 reconstructs the first encoded sample 105 to generate an example reconstructed sample 107. (Block 310).

In response to the execution of the control illustrated in block 310, control proceeds to block 312 and 314. Detailed explanation of the control of block 312 and 314 is explained and illustrated in FIGS. 5 and 6, respectively. Execution of the control of block 312 results in the identification of the first loss function 111 (e.g., the encoder loss function) and the second loss function 113 (e.g., the contextual loss function). Execution of the control of block 314 results in the identification of the third loss function 117 (e.g., the adversarial loss function).

In FIG. 3, the example optimization processor 112 of FIG. 1 determines whether the input sample 102 is malicious. (Block 316). Detailed execution of the control to determine whether the input sample 102 is malicious is explained and illustrated in FIG. 7. In response, the malware detection system 100 determines whether or not to retrain. (Block 318). If the malware detection system 100 determines to retrain (e.g., the control of block 318 returns a result of YES), control proceeds back to block 302. Alternatively, if the malware detection system 100 determines not to retrain (e.g., the control of block 318 returns a result of NO), control proceeds back to block 304. The malware detection system 100 may determine to retrain in the event additional training data is available, a retrain trigger has been received, a threshold amount of time has elapsed, etc. Alternatively, the malware detection system 100 may determine not to retrain in the event no training data is available, a retrain trigger has not been received, a threshold amount of time has not elapsed, etc.

Figure 4:
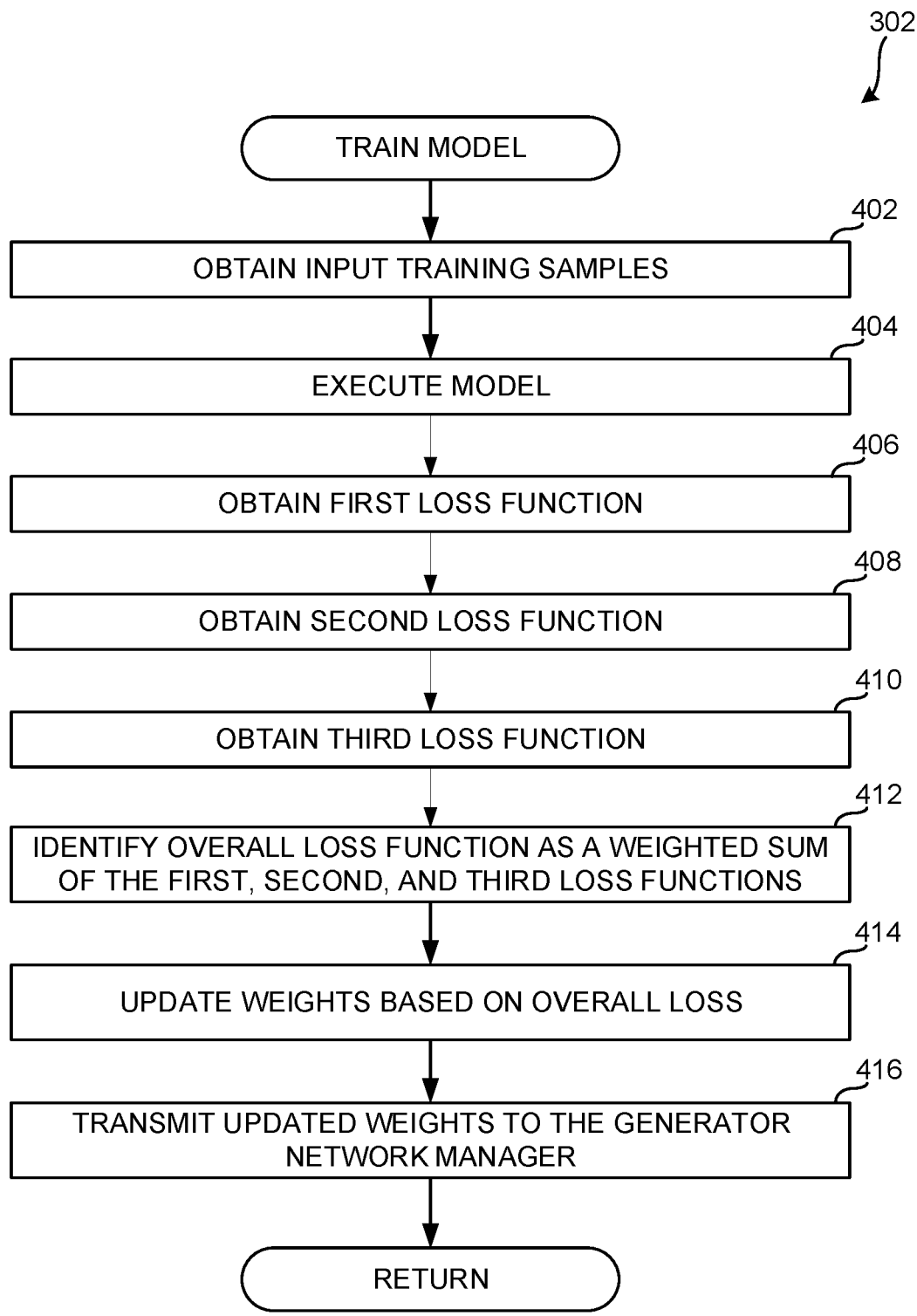
FIG. 4 is a flowchart representative of a process that may be executed to implement the malware detection system of FIG. 1 to train the malware detection system.

FIG. 4 is a flowchart representative of a process that may be executed to implement the malware detection system 100 of FIG. 1 to train the malware detection system 100. In FIG. 4, the malware detection system 100, and more specifically the preliminary encoder network manager 104, obtains the input sample 102. (Block 402). In addition, the malware detection system 100 executes the model. (Block 404). For example, the malware detection system 100 may execute the model using the architecture including the preliminary encoder network manager 104, the generator network manager 106, the secondary encoder network manager 108, and/or the discriminator network manager 110.

In response, the optimization processor 112 obtains the first loss function 111 (e.g., the encoder loss function). (Block 406). The optimization processor 112 also obtains the second loss function 113 (e.g., the contextual loss function). (Block 408). Additionally, the optimization processor 112 obtains the third loss function 117 (e.g., the adversarial loss function). (Block 410).

The optimization processor 112 further identifies the overall loss function as a weighted sum of the first, second, and third loss functions 111, 113, 117. (Block 412). For example, the optimization processor 112 may add, subtract, multiply, divide, etc., the first, second, and third loss functions 111, 113, 117 to identify the overall loss function. (Block 412). The overall loss function may be derived utilizing Equation 4 shown above.

In examples disclosed herein, the optimization processor 112 may adjust and/or otherwise update any weights corresponding to the first, second, and/or third loss functions 111, 113, 117 (e.g., $w_1$, $w_2$, and/or $w_3$). (Block 414). In examples disclosed herein, the optimization processor 112 updates the weights to minimize the overall loss. As a result, the optimization processor 112 transmits the example weight adjustment signal 119 to the generator network manager 106. (Block 416).

Figure 5:
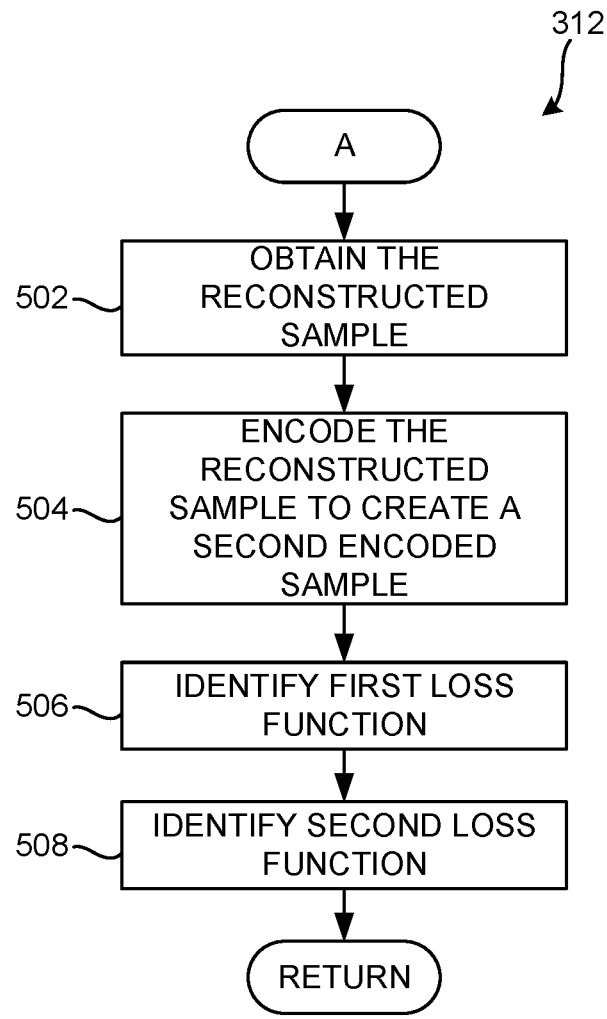
FIG. 5 is a flowchart representative of a process that may be executed to implement the secondary encoder network of FIG. 1 to identify the first loss function and the second loss function of FIG. 1.

FIG. 5 is a flowchart representative of a process that may be executed to implement the secondary encoder network manager 108 of FIG. 1 to identify the first loss function 111 and the second loss function 113 of FIG. 1. In the example of FIG. 5, the secondary encoder network manager 108 obtains the reconstructed sample 107. (Block 502). In addition, the secondary encoder network manager 108 performs a second encoding operation on the reconstructed sample 107 to generate an example second encoded sample 109. (Block 504).

In response, the secondary encoder network manager 108 identifies the example first loss function 111 of FIG. 1. (Block 506). For example, the secondary encoder network manager 108 may utilize Equation 1 to identify the first loss function 111. In addition, the secondary encoder network manager 108 identifies the example second loss function 113. (Block 508). For example, the secondary encoder network manager 108 may utilize Equation 2 to identify the second loss function 113.

Figure 6:
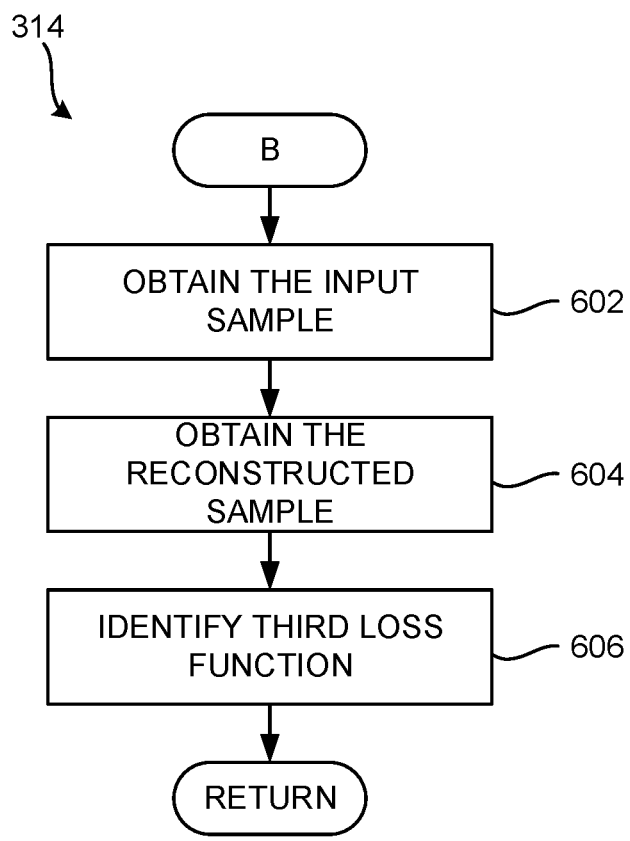
FIG. 6 is a flowchart representative of a process that may be executed to implement the discriminator network of FIG. 1 to identify the third loss function of FIG. 1.

FIG. 6 is a flowchart representative of a process that may be executed to implement the discriminator network manager 110 of FIG. 1 to identify the third loss function 117 of FIG. 1. In the example illustrated in FIG. 6, the discriminator network manager 110 obtains the input sample 102. (Block 602). Similarly, the discriminator network manager 110 obtains the reconstructed sample 107. (Block 604). In response, the discriminator network manager 110 identifies the third loss function 117 (e.g., the adversarial loss function). (Block 606). For example, the third loss function 117 (e.g., the adversarial loss function) may be identified using Equation 3.

Figure 7:
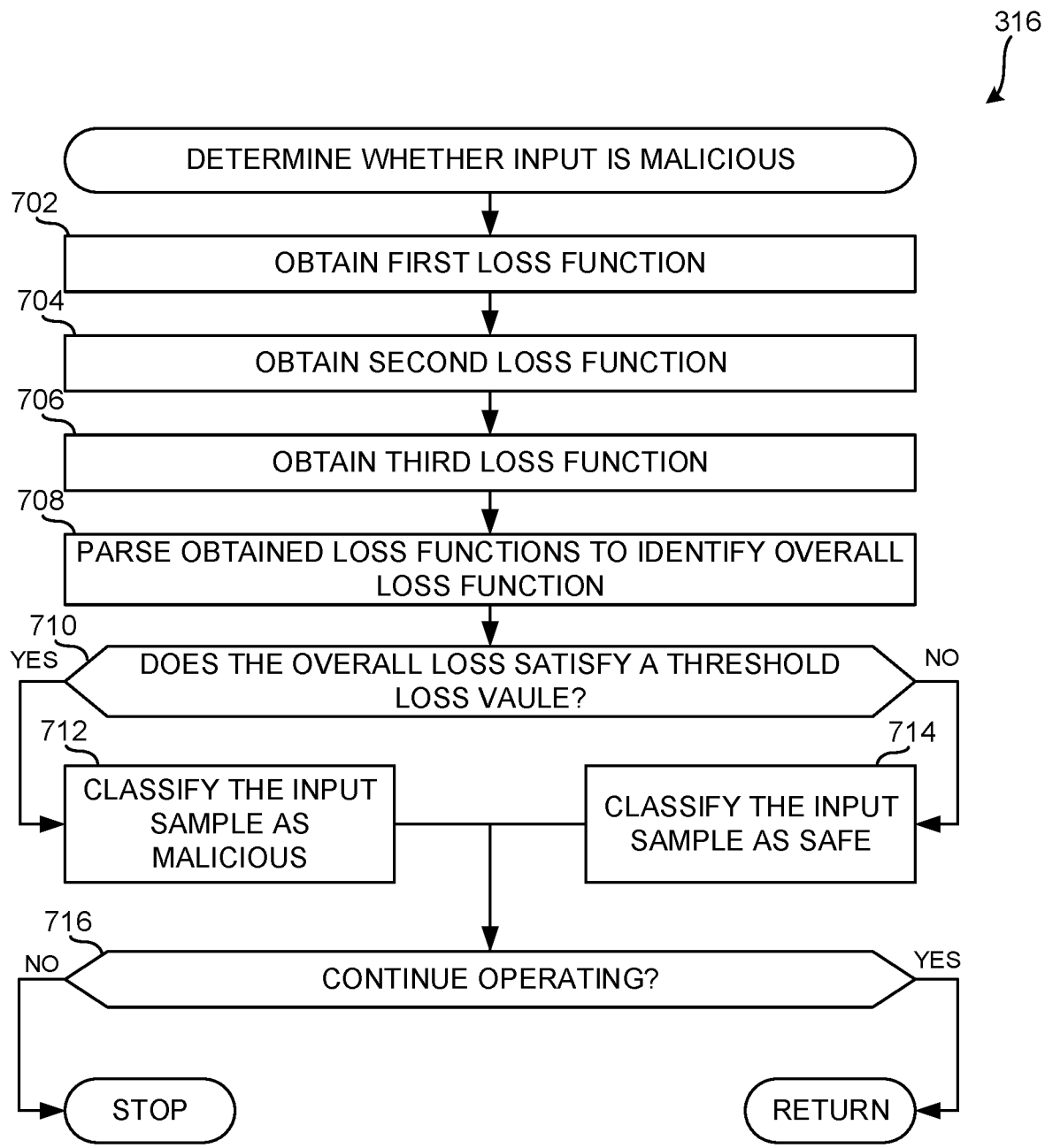
FIG. 7 is a flowchart representative of a process that may be executed to implement the optimization processor of FIG. 1 to determine whether the input sample is malicious.

FIG. 7 is a flowchart representative of a process that may be executed to implement the optimization processor 112 of FIG. 1 to determine whether the input sample 102 is malicious. In FIG. 7, the optimization processor 112 obtains the first loss function 111 (e.g., the encoder loss function). (Block 702). For example, the optimization processor 112 obtains the first loss function 111 (e.g., the encoder loss function) from the secondary encoder network manager 108. Similarly, the optimization processor 112 obtains the second loss function 113 (e.g., the contextual loss function). (Block 704). For example, the optimization processor 112 obtains the second loss function 113 (e.g., the contextual loss function) from the secondary encoder network manager 108). Further, the optimization processor 112 obtains the third loss function 117 (e.g., the adversarial loss function). (Block 706). For example, the optimization processor 112 obtains the third loss function 117 (e.g., the adversarial loss function) from the discriminator network manager 110.

At block 708, the optimization processor 112 parses the obtained loss functions (e.g., the first, second, and third loss functions 111, 113, 117) to identify and/or otherwise generate an overall loss function. (Block 708). In examples disclosed herein, the optimization processor 112 may identify and/or otherwise generate the overall loss function as a weighted sum of the first, second, and third loss functions 111, 113, 117. For example, the overall loss function may be identified using Equation 4 above.

At block 710, the optimization processor 112 determines whether the overall loss satisfies a threshold loss value. (Block 710).

In an alternate example disclosed herein, the optimization processor 112 may implement the control of blocks 708 and 710 based on the first loss function 111 (e.g., the encoder loss). For example, to execute the control of block 708, the optimization processor 112 may parse the first loss function 111 (e.g., the example encoder loss) to identify the overall loss function (e.g., a score corresponding to the abnormity of a given input sample). In such an example, the optimization processor may execute the control of block 710 by determining whether the overall loss function satisfies a loss threshold (e.g., is greater than).

If the optimization processor 112 determines the overall loss satisfies the threshold loss value (e.g., the control of block 710 returns a result of YES), then the optimization processor 112 classifies the input sample 102 as malicious. (Block 712). For example, the optimization processor 112 may determine the overall loss satisfies the threshold loss value when the overall loss is greater than the threshold loss value. In other examples disclosed herein, the optimization processor 112 may determine the overall loss satisfies the threshold loss value when the overall loss is less than, or equal to, the threshold loss value.

Alternatively, if the optimization processor 112 determines the overall loss does not satisfy the threshold loss value (e.g., the control of block 710 returns a result of NO), the optimization processor 112 classifies the input sample as safe. (Block 714). For example, the optimization processor 112 may determine the overall loss does not satisfy the threshold loss value when the overall loss is less than the threshold loss value. In other examples disclosed herein, the optimization processor 112 may determine the overall loss does not satisfy the threshold loss value when the overall loss is greater than, or equal to, the threshold loss value.

In response to the execution of the control illustrated in either block 712, or block 714, the optimization processor 112 determines whether to continue operating. (Block 716). If the optimization processor 112 determines to continue operating (e.g., the control of block 716 returns a result of YES), then control returns to block 318 of FIG. 3. Alternatively, if the optimization processor 112 determines not to continue operating (e.g., the control of block 716 returns a result of NO), then control stops. In examples disclosed herein, the optimization processor 112 may determine to continue operating in response to an additional input sample 102 being available and/or otherwise obtained. Alternatively, the optimization processor 112 may determine not to continue operating in response to a loss of power event, a shut off signal, no additional training to be performed, no additional input samples available, etc.

Figure 8:
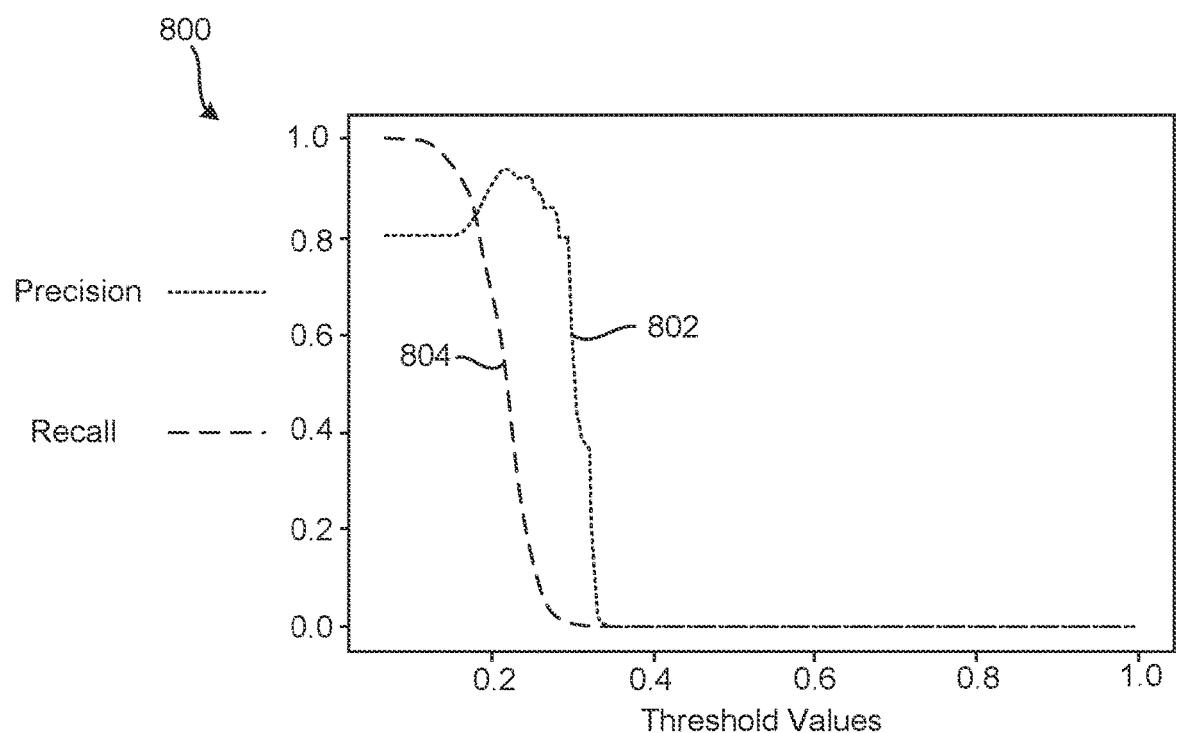
FIG. 8 is a graphical illustration illustrating threshold values versus precision and recall.

FIG. 8 is a graphical illustration 800 illustrating threshold values versus precision and recall. The example illustration 800 of FIG. 8 includes an example first plot 802 and an example second plot 804. The example first plot 802 corresponds to threshold value versus the precision characteristic. The example second plot 804 corresponds to threshold value versus the recall characteristic.

Figure 9:
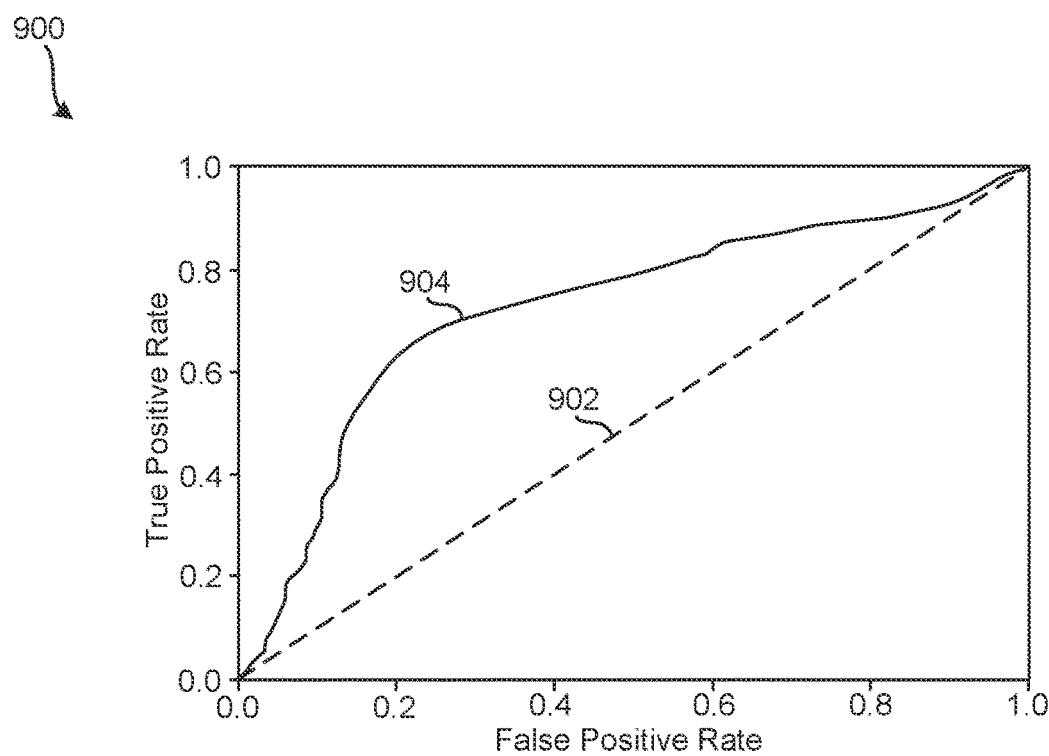
FIG. 9 is an example receiver operating characteristic (ROC) curve illustrating false positive rate versus true positive rate.

FIG. 9 is an example receiver operating characteristic (ROC) curve 900 illustrating false positive rate versus true positive rate. The ROC curve 900 includes an example first plot 902 and an example second plot 904. Illustrated in FIG. 9, the first plot 902 is an example reference to determine accuracy. The second plot 904 corresponds to a relationship between false positive rate and true positive rate.

In the example illustrated in FIG. 9, the area under the curve (AUC) performance metric is 0.72.

Illustrated in the below example table, Table 1, are numerical results relating to the plots, characteristics, and/or otherwise depictions illustrated in FIGS. 8 and/or 9.

TABLE 1

| | |
|---|---|
| True Positive (count) | 40976 |
| False Positive (count) | 7292 |
| True Negative (count) | 4548 |
| False Negative (count) | 7184 |
| Recall Rate (percentage) | 85.08% |
| Precision Rate (percentage) | 84.89% |

The data in Table 1 corresponds to the true positive, false positive, true negative, false negative, recall, and precision relating to 60,000 input samples (e.g., 60,000 input samples 102 in FIG. 1) input in the malware detection system 100 of FIG. 1. The data in Table 1 corresponds to respective counts and/or percentages when the threshold loss value is 0.182.

Figure 10:
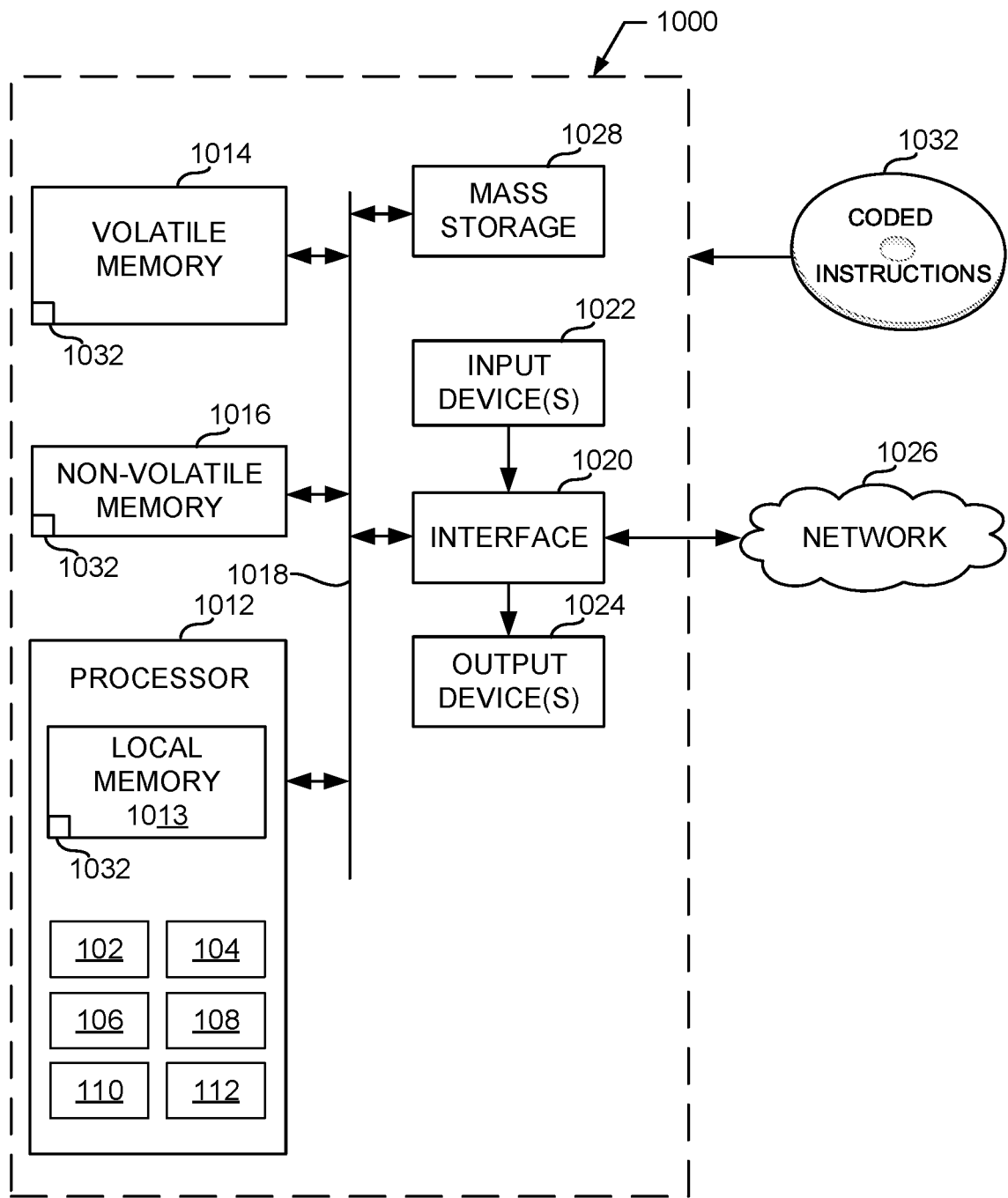
FIG. 10 is a block diagram of an example processor platform structured to execute the instructions of FIGS. 3, 4, 5, 6, and/or 7 to implement the malware detection system of FIG. 1.

FIG. 10 is a block diagram of an example processor platform structured to execute the instructions of FIGS. 3, 4, 5, 6, and/or 7 to implement the malware detection system 100 of FIG. 1. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example input sample 102, the example preliminary encoder network manager 104, the example generator network manager 106, the example secondary encoder network manager 108, the example discriminator network manager 110, the example optimization processor 112.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIGS. 3, 4, 5, 6, and/or 7 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed that perform malware detection using a generative adversarial network. The disclosed methods, apparatus and articles of manufacture improve the efficiency of using a computing device by utilizing an autoencoder and GAN network to classify an input sample as malicious or safe. In examples disclosed herein, use a GAN to reconstruct an encoded sample, the encoded sample being a signal representation of an input sample. As such, examples disclosed herein compare the reconstructed sample to the input sample to classify and/or determine whether the input sample is malicious. Examples disclosed herein utilize an unsupervised network and, thus, do not labeling errors can be avoided. The disclosed methods, apparatus and articles of manufacture are accordingly directed to one or more improvement(s) in the functioning of a computer.

Example methods, apparatus, systems, and articles of manufacture to perform malware detection using a generative adversarial network are disclosed herein. Further examples and combinations thereof include the following:

Example 1 includes an apparatus comprising a first encoder network to encode an input sample into a first encoded sample, the first encoder network implemented using a multilayer perception (MLP) network, a generator network to reconstruct the first encoded sample to generate a reconstructed sample, a discriminator network to, in response to obtaining the first encoded sample and the reconstructed sample, generate a loss function based on the reconstructed sample and the input sample, and an optimization processor to, when the loss function satisfies a threshold loss value, classify the input sample as malicious.

Example 2 includes the apparatus of example 1, further including a second encoder network to generate a second encoded sample by encoding the reconstructed sample.

Example 3 includes the apparatus of example 2, wherein the second encoder network determines a second loss function based on the second encoded sample and the first encoded sample.

Example 4 includes the apparatus of example 2, wherein the second encoder network is implemented using a second MLP network.

Example 5 includes the apparatus of example 1, wherein the loss function satisfies the threshold loss value when the loss function is greater than the threshold loss value.

Example 6 includes the apparatus of example 1, wherein the generator network and the discriminator network are implemented using a first deep convolutional generative adversarial network (DCGAN) and a second DCGAN, respectively.

Example 7 includes the apparatus of example 1, wherein the input sample is a portable executable file.

Example 8 includes at least one non-transitory computer readable medium comprising instructions which, when executed, cause at least one processor to at least encode an input sample into a first encoded sample using a multilayer perception (MLP) network, reconstruct the first encoded sample to generate a reconstructed sample, in response to obtaining the first encoded sample and the reconstructed sample, generate a loss function based on the reconstructed sample and the input sample, and when the loss function satisfies a threshold loss value, classify the input sample as malicious.

Example 9 includes the at least one computer readable medium of example 8, wherein the instructions, when executed, further cause the at least one processor to generate a second encoded sample by encoding the reconstructed sample using a second MLP network.

Example 10 includes the at least one computer readable medium of example 9, wherein the instructions, when executed, further cause the at least one processor to determine a second loss function based on the second encoded sample and the first encoded sample.

Example 11 includes the at least one computer readable medium of example 8, wherein the loss function satisfies the threshold loss value when the loss function is greater than the threshold loss value.

Example 12 includes the at least one computer readable medium of example 8, wherein the instructions, when executed, further cause the at least one processor to generate the reconstructed sample and the loss function using a first deep convolutional generative adversarial network (DC-GAN) and a second DCGAN, respectively.

Example 13 includes the at least one non-transitory computer readable medium of example 8, wherein the input sample is a portable executable file.

Example 14 includes a method comprising encoding an input sample into a first encoded sample using a multilayer perception (MLP) network, reconstructing the first encoded sample to generate a reconstructed sample, in response to obtaining the first encoded sample and the reconstructed sample, generating a loss function based on the reconstructed sample and the input sample, and when the loss function satisfies a threshold loss value, classifying the input sample as malicious.

Example 15 includes the method of example 14, further including generating a second encoded sample by encoding the reconstructed sample.

Example 16 includes the method of example 15, further including determining a second loss function based on the second encoded sample and the first encoded sample.

Example 17 includes the method of example 15, wherein the second encoded sample is generated using a second MLP network.

Example 18 includes the method of example 14, wherein the loss function satisfies the threshold loss value when the loss function is greater than the threshold loss value.

Example 19 includes the method of example 14, wherein the reconstructed sample and the loss function are generated using a first deep convolutional generative adversarial network (DCGAN) and a second DCGAN, respectively.

Example 20 includes the method of example 14, wherein the input sample is a portable executable file.

Example 21 includes an apparatus comprising means for encoding an input sample into a first encoded sample using a multilayer perception (MLP) network, means for reconstructing the first encoded sample to generate a reconstructed sample, means for generating to, in response to obtaining the first encoded sample and the reconstructed sample, generate a loss function based on the reconstructed sample and the input sample, and means for classifying the input sample as malicious when the loss function satisfies a threshold loss value.

Example 22 includes the apparatus of example 21, further including second means for encoding the reconstructed sample to generate a second encoded sample.

Example 23 includes the apparatus of example 22, wherein the second encoding means is to determine a second loss function based on the second encoded sample and the first encoded sample.

Example 24 includes the apparatus of example 22, wherein the second encoding means is to generate the second encoded sample using a second MLP network.

Example 25 includes the apparatus of example 21, wherein the loss function satisfies the threshold loss value when the loss function is greater than the threshold loss value.

Example 26 includes the apparatus of example 21, wherein the means for reconstructing is to generate the reconstructed sample using a first deep convolutional generative adversarial network (DCGAN), and wherein the means for generating is to generate and the loss function using a second DCGAN.

Example 27 includes the apparatus of example 21, wherein the input sample is a portable executable file.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   memory;
   instructions in the apparatus; and
   processor circuitry to execute the instructions to:
      encode an input sample into a first encoded sample, the input sample encoded using a first multilayer perception (MLP) network;
      reconstruct the first encoded sample to generate a reconstructed sample;
      encode the reconstructed sample using a second MLP network to generate a second encoded sample;

in response to obtaining the first encoded sample and the reconstructed sample, generate a first loss function and a second loss function based on the reconstructed sample and the input sample; and when a weighted sum of the first loss function and the second loss function satisfies a threshold loss value, classify the input sample as malicious.

2. The apparatus of claim 1, wherein the processor circuitry is to:
determine a third loss function based on the second encoded sample and the first encoded sample; and
in response to a weighted sum of the first loss function, the second loss function, and the third loss function satisfying the threshold loss value, classify the input sample as malicious.

3. The apparatus of claim 1, wherein the weighted sum of the first loss function and the second loss function satisfies the threshold loss value when the weighted sum is greater than the threshold loss value.

4. The apparatus of claim 1, wherein the first encoded sample is reconstructed using a first deep convolutional generative adversarial network (DCGAN), and the first loss function is generated using a second DCGAN.

5. The apparatus of claim 1, wherein the input sample is a portable executable file.

6. At least one non-transitory computer readable medium comprising instructions which, when executed, cause at least one processor to at least:
encode an input sample into a first encoded sample using a first multilayer perception (MLP) network;
reconstruct the first encoded sample to generate a reconstructed sample;
encode the reconstructed sample using a second MLP network to generate a second encoded sample;
in response to obtaining the first encoded sample and the reconstructed sample, determine a first loss function based on the reconstructed sample and the input sample;
determine a second loss function based on the first encoded sample and the second encoded sample; and
when a weighted sum of the first loss function and the second loss function satisfies a threshold loss value, classify the input sample as malicious.

7. The at least one computer readable medium of claim 6, wherein the weighted sum of the first loss function and the second loss function satisfies the threshold loss value when the weighted sum is greater than the threshold loss value.

8. The at least one computer readable medium of claim 6, wherein the instructions, when executed, cause the at least one processor to generate the reconstructed sample and the first loss function using a first deep convolutional generative adversarial network (DCGAN) and a second DCGAN, respectively.

9. The at least one computer readable medium of claim 6, wherein the input sample is a portable executable file.

10. The at least one computer readable medium of claim 6, wherein the instructions, when executed, cause the at least one processor to:
determine a third loss function based on the reconstructed sample and the input sample; and
in response to a weighted sum of the first loss function, the second loss function, and the third loss function satisfying the threshold loss value, classify the input sample as malicious.

11. A method comprising:
encoding an input sample into a first encoded sample using a first multilayer perception (MLP) network;
reconstructing the first encoded sample to generate a reconstructed sample;
encoding the reconstructed sample using a second MLP network to obtain a second encoded sample;
in response to obtaining the first encoded sample and the reconstructed sample, generating a first loss function based on the reconstructed sample and the input sample;
generating a second loss function based on the first encoded sample and the second encoded sample; and
when a weighted sum of the first loss function and the second loss function is greater than a threshold loss value, classifying the input sample as malicious.

12. The method of claim 11, wherein the reconstructed sample and the first loss function are generated using a first deep convolutional generative adversarial network (DCGAN) and a second DCGAN, respectively.

13. The method of claim 11, wherein the input sample is a portable executable file.

14. The method of claim 11, further including:
determining a third loss function based on the reconstructed sample and the input sample; and
in response to a weighted sum of the first loss function, the second loss function, and the third loss function satisfying the threshold loss value, classifying the input sample as malicious.

\* \* \* \* \*